(12) United States Patent
Mai et al.

(10) Patent No.: US 9,129,445 B2
(45) Date of Patent: Sep. 8, 2015

(54) EFFICIENT TONE-MAPPING OF HIGH-BIT-DEPTH VIDEO TO LOW-BIT-DEPTH DISPLAY

(71) Applicant: Dolby Laboratories Licensing Corporation, San Francisco, CA (US)

(72) Inventors: Zicong Mai, Burnaby (CA); Panos Nasiopoulos, Vancouver (CA); Rabab K Ward, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 217 days.

(21) Appl. No.: 13/796,165

(22) Filed: Mar. 12, 2013

(65) Prior Publication Data

US 2013/0241931 A1  Sep. 19, 2013

Related U.S. Application Data

(60) Provisional application No. 61/610,734, filed on Mar. 14, 2012.

(51) Int. Cl.
*G09G 5/02* (2006.01)
*G06T 11/60* (2006.01)
*G06T 5/00* (2006.01)
*H04N 1/64* (2006.01)

(52) U.S. Cl.
CPC .............. *G06T 11/60* (2013.01); *G06T 5/009* (2013.01); *H04N 1/646* (2013.01); *G06T 2207/20208* (2013.01)

(58) Field of Classification Search
CPC ........................................... G06T 5/007–5/009
See application file for complete search history.

(56) References Cited

U.S. PATENT DOCUMENTS

| | | | |
|---|---|---|---|
| 5,565,931 | A | 10/1996 | Girod |
| 5,638,138 | A | 6/1997 | Hickman |
| 5,982,926 | A | 11/1999 | Kuo |
| 7,065,257 | B2 | 6/2006 | Soga |
| 7,652,808 | B2 | 1/2010 | Bala |
| 8,184,919 | B2 | 5/2012 | Ward |
| 8,289,412 | B2 | 10/2012 | Banterle |

(Continued)

OTHER PUBLICATIONS

Banterle et al., Inverse Tone Mapping, Proceedings of the 4th International Conference on Computer Graphics and Interactive Techniques in Australasia and Southeast Asia, 2006, pp. 349-356.*
Mai, Z. et al. "Computationally Efficient Tone-Mapping of High-Bit-Depth Video in the YCBCR Domain Domain" IEEE International Worksop on Multimedia Signal Processing, Apr. 2011.

(Continued)

*Primary Examiner* — Charles Tseng (57) ABSTRACT

Several embodiments of an efficient tone mapping of high bit depth video to low bit depth displays are disclosed. In one embodiment, a system maps an input image data of a high dynamic range (HDR) onto output image data of a lower dynamic range (LDR) and where the mapping does not transform the input image data from one color space to another color space. One embodiment comprises a tone mapping module which outputs a tone-mapped luminance signal for output image data and a color mapping module which outputs chroma signals for the output image data. Intermediate image processing steps may be avoided and hence may increase the efficiency of the mapping.

7 Claims, 4 Drawing Sheets

(56) References Cited

U.S. PATENT DOCUMENTS

| | | |
|---|---|---|
| 2002/0067435 A1 | 6/2002 | Rapaich |
| 2008/0310501 A1* | 12/2008 | Ward et al. ............... 375/240.02 |
| 2009/0257652 A1 | 10/2009 | Liu |
| 2010/0172411 A1 | 7/2010 | Efremov |
| 2010/0328490 A1* | 12/2010 | Kurane et al. .............. 348/229.1 |
| 2011/0194618 A1 | 8/2011 | Gish |
| 2012/0026405 A1 | 2/2012 | Atkins |

OTHER PUBLICATIONS

Toda, M. et al. "High Dynamic Range Rendering Method for YUV Images with Global Luminance Correction" 2011 IEEE International Conference on Consumer Electronics (ICCE), pp. 255-256.

Toda M. et al. "High Dynamic Range Rendering for YUV Images with a Constraint on Perceptual Chroma Preservation" 2009 IEEE pp. 1817-1820.

* cited by examiner

EFFICIENT TONE-MAPPING OF HIGH-BIT-DEPTH VIDEO TO LOW-BIT-DEPTH DISPLAY

CROSS REFERENCE TO RELATED APPLICATIONS

This application claims the benefit of priority to related, co-pending Provisional U.S. Patent Application No. 61/610,734, filed on Mar. 14, 2012 entitled "Efficient Tone-Mapping Of High-Bit-Depth Video To Low-Bit-Depth Display" by Zicong Mai et. al., hereby incorporated by reference in its entirety.

TECHNICAL FIELD

The present invention relates to display systems and, more particularly, to novel systems and methods for tone-mapping of high dynamic range (HDR) images onto lower dynamic range (LDR) displays.

BACKGROUND

It is known to provide tone mapping of HDR images onto LDR displays. For example, the following, co-owned patent applications describe such subject matter: (1) United States Patent Application Number 20100208143 to Banterle et al., published Aug. 19, 2010 and entitled "APPARATUS AND METHODS FOR BOOSTING DYNAMIC RANGE IN DIGITAL IMAGES"; (2) United States Patent Application Number 20110194618 to Gish et al., published Aug. 11, 2011 and entitled "COMPATIBLE COMPRESSION OF HIGH DYNAMIC RANGE, VISUAL DYNAMIC RANGE, AND WIDE COLOR GAMUT VIDEO"; (3) United States Patent Application Number 20110194758 to Ward, published Aug. 11, 2011 and entitled "REPRESENTING AND RECONSTRUCTING HIGH DYNAMIC RANGE IMAGES"; (4) United States Patent Application Number 20120026405 to Atkins et al., published Feb. 2, 2012 and entitled "SYSTEM AND METHOD OF CREATING OR APPROVING MULTIPLE VIDEO STREAMS"; (5) United States Patent Application Number 20100172411 to Efremov et al., published Jul. 8, 2010 and entitled "HIGH DYNAMIC RANGE CODECS"—all of which are hereby incorporated by reference in their entirety.

SUMMARY

Several embodiments of display systems and methods of their manufacture and use are herein disclosed.

Several embodiments of an efficient tone mapping of high bit depth video to low bit depth displays are disclosed. In one embodiment, a system maps an input image data of a high dynamic range (HDR) onto output image data of a lower dynamic range (LDR) and where the mapping does not transform the input image data from one color space to another color space. One embodiment comprises a tone mapping module which outputs a tone-mapped luminance signal for output image data and a color mapping module which outputs chroma signals for the output image data. Intermediate image processing steps may be avoided and hence may increase the efficiency of the mapping.

In one embodiment, a system for mapping an input image data of a first image data format, said first image data format comprising a first dynamic range, to an output image data of a second image data format, said second image data format comprising a second dynamic range, said second dynamic range comprising a lower dynamic range than said first dynamic image range, said system comprising: a tone mapping module, said tone mapping module inputting the luminance signal from said input image data of said first image data format and outputting a tone-mapped luminance signal for output image data of said second image data format; a color mapping module, said color mapping module inputting the chroma signal from said input image data of said first dynamic range and inputting said tone-mapped luminance signal from said tone mapping module, said tone-mapped luminance signal being associated with said chroma signal and said color mapping module outputting chroma signals for said output image data; and wherein further said first image data format is the same as said second image data format.

In another embodiment, A method for mapping an input image data of a first image data format, said first image data format comprising a first dynamic range, to an output image data of a second image data format, said second image data format comprising a second dynamic range, said second dynamic range comprising a lower dynamic range than said first dynamic image range, the steps of said method comprising: inputting said input image data, said input image data of a first image data format, said first image data format comprising a first dynamic range; tone mapping said input image data, said tone mapping extracting a tone-mapped luminance signal from said input image data; color mapping said input image data, said color mapping inputting said tone-mapped luminance signal and chroma signal from said input image data and outputting; and outputting an output image data of a second image data format and wherein said second image data format is the same as said first image data format.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans fewer orders of magnitude—e.g., 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Introduction

High dynamic range (HDR) content is able to provide superior picture quality; but applies a higher-bit-depth encoding compared to its low dynamic range (LDR) counterpart. Tone-mapping may be applied as a process that converts HDR to LDR signals. Most tone-mapping methods are derived only for the luminance component. This mapping process may then be applied to each of the R, G and B components in order to generate the final tone-mapped color image. In other words, this color correction approach may not typically be directly applied to most videos—since most videos are usually encoded in the YCbCr color space.

Figure 1:
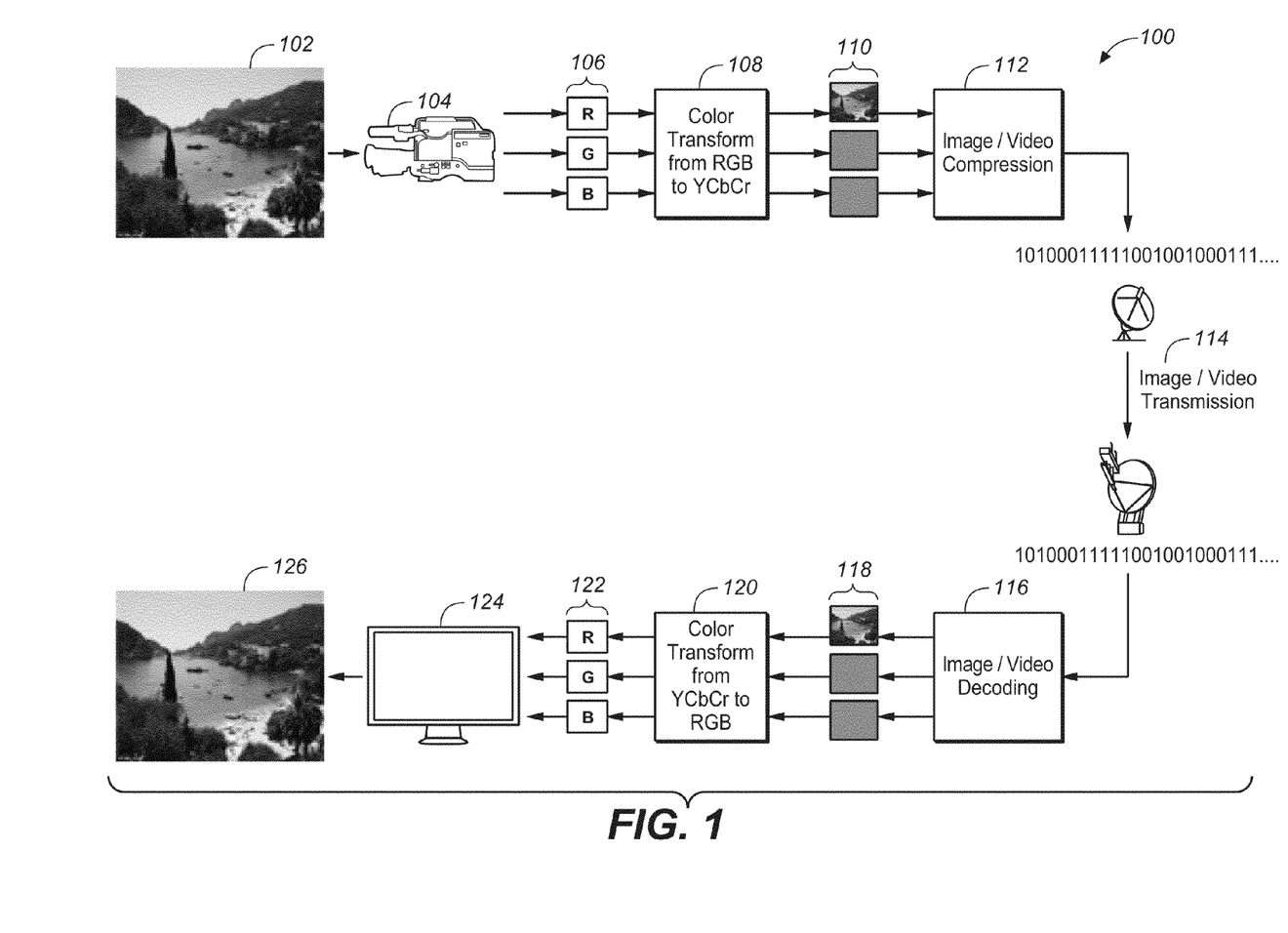
FIG. 1 is a high level diagram depicting one possible image pipeline rendering image and/or video data onto a display device.

FIG. 1 depicts a high level diagram 100 showing one possible image pipeline of rendering HDR images and/or video onto a display. A scene 102 may be captured by a HDR camera 104 (and/or some image capture device) and the image data may be stored as RGB image data format 106. RGB image data may be subsequently transformed (108) into another format, e.g., YCbCr and subsequently stored (110). The image data may be compressed (112) for subsequent transmission (114).

Upon reception of the image data, a reverse set of operations may occur. For example, decompressing and/or decoding (116) may be applied to the image data and the resulting image data may be in a format, e.g., YCbCr (118). This image data may be transformed (120) into another format, e.g. RGB image data and sent to a display (possibly HDR enabled) and the resulting image (126) is rendered upon the display.

Figure 2:
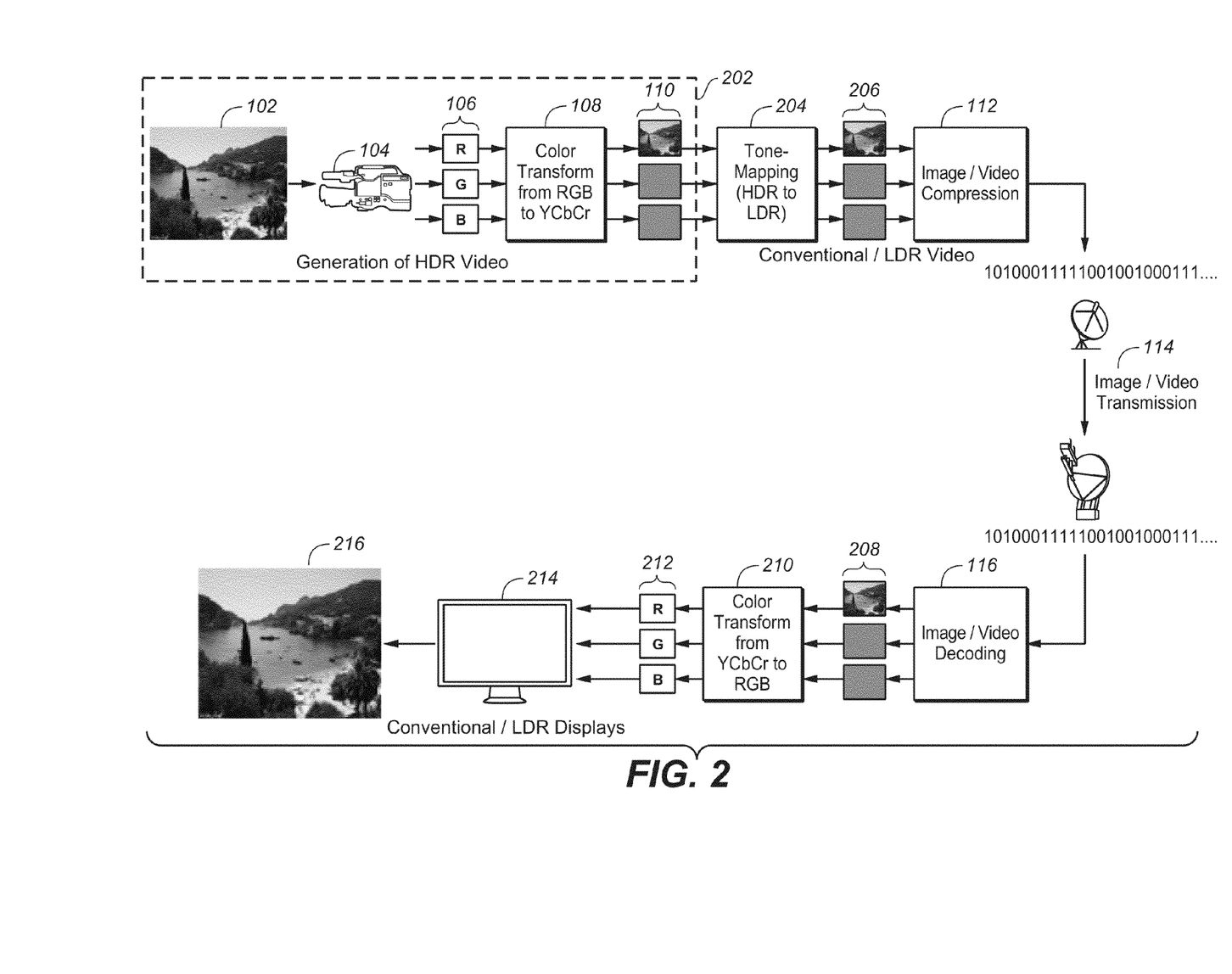
FIG. 2 is another high level diagram showing one possible image pipeline of rendering HDR images and/or video on a LDR display.

If the display does not have the capabilities to render HDR image data, then another transformation may be applied. FIG. 2 depicts another high level diagram showing one possible image pipeline of rendering HDR images and/or video onto a LDR display. Box 202 outlines the processes (similar to those in FIG. 1) where the generation of HDR video and/or image data may take place. At some point in the image pipeline, there may be a tone-mapping (204) from HDR to VDR and/or LDR video and/or image data. Upon reception, similar inverse operations may occur to the image data—however, at this point, the image data is encoded for LDR (or VDR) format. It should be appreciated that the tone mapping operation might occur at other suitable places within the image pipeline itself—including at the receiving codec.

Compared to existing 8-bit or low dynamic range (LDR) content, high dynamic range (HDR) videos provide life-like visual experience with significantly higher contrast and richer colors. To represent the larger amount of information, the color components of HDR video need to be encoded with more bits, e.g., 12 or 16 bits.

HDR content is usually displayed on high-bit-depth output devices; however, most existing displays may support only 8-bit signals. In order to view HDR content on existing imaging systems, tone-mapping techniques that convert HDR to 8-bit LDR signals may be employed. As noted above, a number of tone-mapping operators (TMOs) have been developed with a variety of designing principals, such as simulating photographic tone reproduction, modeling humans' photoreceptor adaption and minimizing the perceptual contrast distortion for variable displays. Typically, tone-mapping operators are derived for only the luminance channel. To produce color representation, one approach is to tone-map the luminance channel first and then to map each of the RGB channels based on the change of luminance.

The above color correction approach may be used if it is applied to HDR content represented in the RGB format. However, it is not usually directly adopted for videos formatted in the YCbCr color space, which is the most commonly used format in practice and it is supported by the major image/video encoding standards, including JPEG 2000 and H.264/AVC. After the luminance component (Y) is tone-mapped, the conventional way to obtain the color components for a YCbCr video is to convert the signal from YCbCr to the RGB space first, then perform the normal color correction in the RGB domain, and finally transform the tone-mapped color signal back to the YCbCr space. Taking into consideration the fact that the chrominance components Cb and Cr are usually down-sampled for most applications, tone-mapping YCbCr signals may employ more computation since up-sampling may be performed prior to the RGB conversion.

A Conventional Pipeline

For clarity and simplicity and in order to make it easier for the reader to follow the content, the following convention is adopted for the equations and figures found herein. In general, capitalized symbols denote high-bit-depth signals while the lower case ones—e.g., corresponding to their 8-bit counterparts. A symbol with an apostrophe (') denotes the gamma corrected version of the variable.

Figure 3:
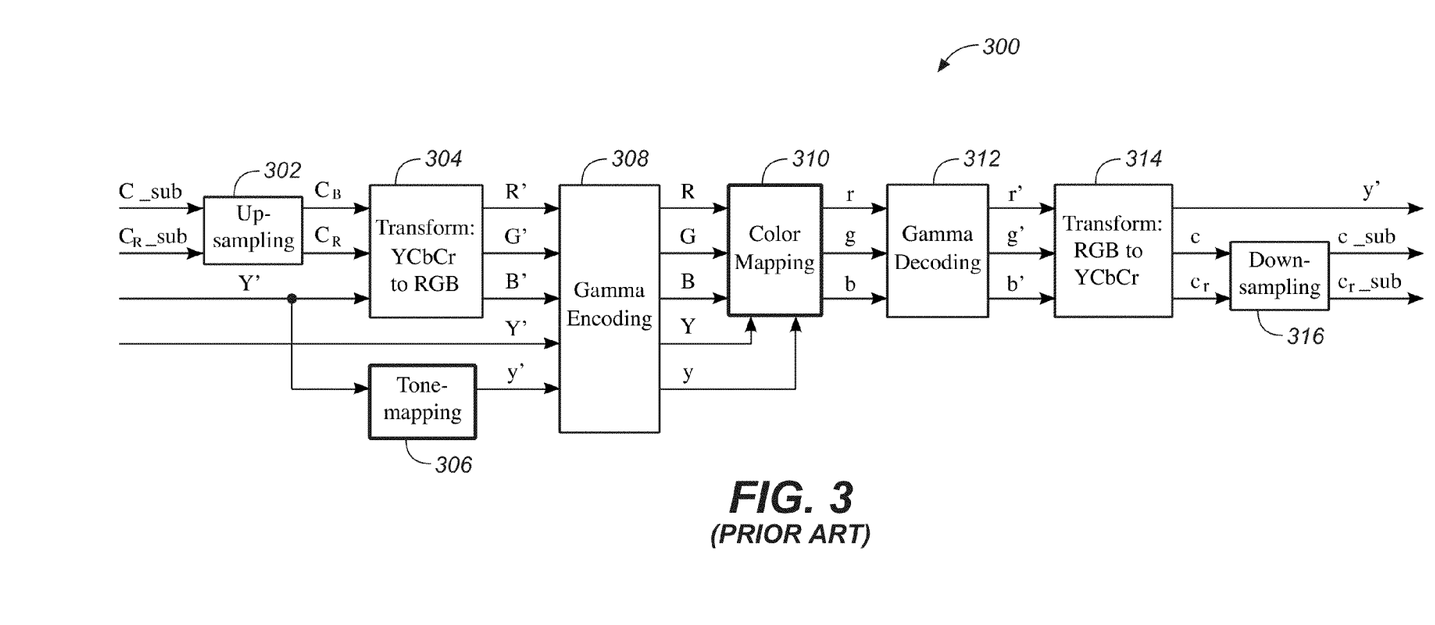
FIG. 3 is one conventional image processing pipeline of providing HDR images to be displayed on LDR displays having an intermediate color space transformation.

FIG. 3 demonstrates the full pipeline (300) of a conventional approach for tone-mapping a high-bit-depth YCbCr video frame. The original chromatic components Cb and Cr are sub-sampled (CB_sub and CR_sub) while luminance is in its full resolution. The Cb and Cr signals may be up-sampled (302) before the color transform (304) is applied to produce the non-linear R', G' and B' signals. The tri-chromatic colors may then be gamma decoded (308) to yield the linearized R, G and B components, which are required for the color correction process (310) in addition to the high bit-depth luminance Y and the tone-mapped luminance, y. As a result, 8-bit r, g, and b signals in the linear domain are generated from color correction. Gamma correction (312)—as well as the color transform (314)—are performed to produce the full-resolution low dynamic range signal in the YCbCr color space. Finally, the 8-bit Cb and Cr components are sub-sampled (316) for practical use.

As it can be observed, the above process involves a few intermediate stages in order to achieve the tone-mapping of the Cb and Cr components. In addition to high computational cost, the conventional method may introduce information loss by the transformation between the RGB and the YCbCr color spaces. In several embodiments of the systems and method as outlined herein, it may be desirable to generate the tone-mapped YCbCr signal with the least possible complexity. In several embodiments, many intermediate processes (including possibly, up-sampling, transform from YCbCr to RGB, gamma decoding, gamma correction, transform from RGB to YCbCr and down-sampling) may be bypassed. As a result, a high-bit-depth YCbCr video sequence may be directly tone-mapped to an 8-bit YCbCr stream. In many embodiments, round-off errors may be avoided (as might have been introduced by the intermediate steps of the conventional method), and, in turn, may produce a more accurate LDR representation.

Various Embodiments

Figure 4:
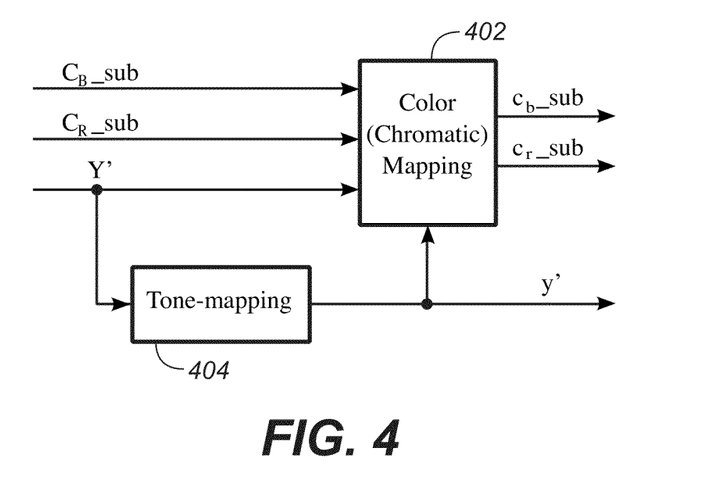
FIG. 4 is a high level block diagram of an image processing pipeline as made in accordance with the principles of the present application

FIG. 4 shows one embodiment of a system made in accordance with the principles of the present application. As may be seen, a color and/or chromatic mapping 402 takes, as input, e.g., YCbCr signals for a HDR signal. Additionally, color mapping 402 may take as input a tone-mapped luminance signal y', as derived from Y' as detailed below. In other embodiments, the tone mapping module may input the full video and/or image data set (or a subset thereof) and may comprise circuitry to extract the luminance signal from the input video and/or image data.

The input image data to the system may be of a first dynamic range that will be of a higher dynamic range than the output image data from the system. The tone mapping module may supply the color mapping module with the tone-mapped luminance signal (y') which is associated with the chroma signal input to the color mapping module.

This portion of the signal may suffice to supplant the image processing pipeline of FIG. 3. It will be noted that many (if not all) of the other intermediate processing modules and/or steps may be bypassed with the color mapping as set forth herein.

Figure 5:
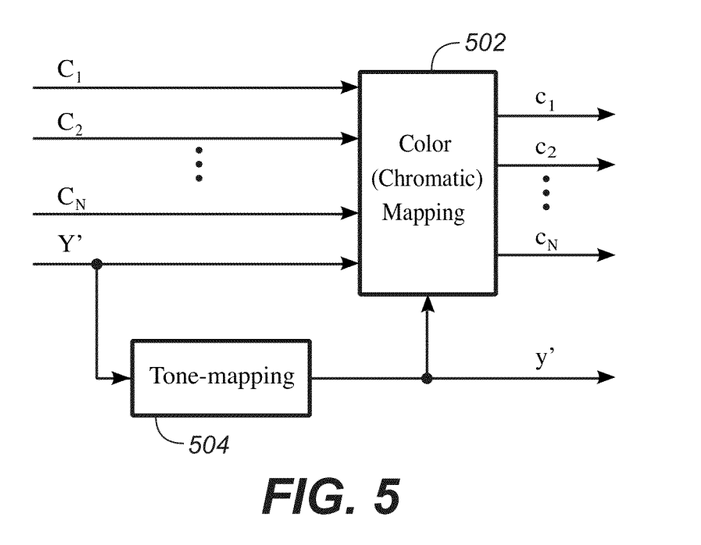
FIG. 5 is a high level flowchart of one embodiment of the image processing made in accordance with the principles of the present application.

FIG. 5 is another embodiment of a system made in accordance with the principles of the present application. In this embodiment, color mapping 502 and tone mapping 504 may work a number of chromatic channels. This may be suitable for use on other color spaces—and/or on a multi-primary color space (depending on the image capture and the image display device). It may be the case that the display device may be a multi-primary set of m-primary color emitters or points and the image captured is encoded with n-primary color emitters or points. In any event, it should be appreciated that many (if not all) of the intermediate processing modules and/or steps may no longer be employed (unless desired).

Having now seen the potential simplification of the processing system, it will now be described several embodiments of the processing steps and/or methodologies that may be affected therein. In one embodiment, a system is disclosed that maps the Cb and the Cr components from the high-bit-depth HDR signal directly to its LDR counterpart, given the mapping of the luminance channel. In one implementation, this embodiment may employ parameter values derived for different ITU standards.

In this embodiment, it may be desirable to derive a closed-form mapping formula for the Cb component. It will be appreciated that a mapping may be adapted for the Cr component as well.

One such possible closed-form mapping may be as follows. The Cb component reflects the difference between the luma channel and the blue channel, which may be written as:

$$C_B = M_B(B'-Y') + T \qquad \text{Equ. (1)}$$

$$c_b = m_b(b'-y') + t$$

where T and t are the offsets for HDR and LDR signals respectively. In the following D is denoted to be substantially the maximum intensity value of the high bit-depth signal, e.g., 1023 for a 10-bit signal. The values of T and t may be assigned to be $(D+1)/2$ and 128 respectively. The constants $M_B$ and $m_b$ are defined as:

$$M_B = \frac{1}{2 \times (1-K_B)} \times \frac{Q_B}{D} \qquad \text{Equ. (2)}$$

$$m_b = \frac{1}{2 \times (1-k_b)} \times \frac{q_b}{255}$$

where the values of $K_B$ and $k_b$ differ in different standards. For example, $K_B = k_b = 0.114$ for ITU-R BT.601 and $K_B = k_b = 0.0722$ for ITU-R BT.709. The factors $Q_B$ and $q_b$ may be employed to scale the signals to a proper intensity level—e.g., $Q_B$ and $q_b$ can be as large as $(D-1)$ and 254, respectively. It will be appreciated that these values may vary in different standards. For instance, $q_b$ may be set to be 224 according to ITU-R BT.601 while JPEG may allow $q_b$ to be 255.

In tone-mapping, one possible color correction embodiment may be given as follows:

$$b = \left(\frac{B}{Y}\right)^s \times y \qquad \text{Equ. (3)}$$

where s is used to adjust saturation (i.e. a saturation adjustment term). It should be appreciated that although the correction with respect to the blue channel is shown, the same correction may be applied to the red and the green channels.

It should be noted that all values in Equation (3) may be in the linearized color space. That is, they may not need to be gamma-corrected. However, the input and the output in our tone-mapping pipeline may be gamma-corrected. The following formulas may be used to convert the linearized signals to gamma-corrected signals and vice versa. Equations (4) may be used for the luma channel and Equations (5) may be applied to the color channels:

$$\frac{Y'}{D} = \left(\frac{Y}{D}\right)^{\frac{1}{\Gamma}} \text{ and } \frac{y'}{255} = \left(\frac{y}{255}\right)^{\frac{1}{\gamma}} \quad \text{Equ. (4)}$$

$$\frac{B'}{D} = \left(\frac{B}{D}\right)^{\frac{1}{\Gamma}} \text{ and } \frac{b'}{255} = \left(\frac{b}{255}\right)^{\frac{1}{\gamma}} \quad \text{Equ. (5)}$$

The values of D and 255 may be used to normalize the signals to 0-1, which may be desired in order to keep the output range the same as the input range (0-1). The gamma values for LDR (γ) and HDR (Γ) may be different.

Equations (1) may be re-organized as:

$$B' = \frac{C_B - T}{M_B} + Y' \quad \text{Equ. (6)}$$

$$b' = \frac{c_b - t}{m_b} + y'$$

It may be possible to rewrite Equations (4) and (5) in terms of B and b, and substitute them into Equation (3). After simplification, it is possible to obtain:

$$b' = \left(\frac{B'}{Y'}\right)^{\frac{\Gamma \cdot s}{\gamma}} \cdot y' \quad \text{Equ. (7)}$$

After suitable substitutions, the expressions of B' and b'—obtained by Equations (6)—may be placed into the form similar to Equation (7). After re-organizing, the closed-form formula that maps the Cb component from high bit depth to 8 bits may be written as follows:

$$c_b = m_b \left[ \left( \frac{C_B - T}{M_B \cdot Y'} + 1 \right)^{\frac{\Gamma \cdot s}{\gamma}} - 1 \right] \cdot y' + t \quad \text{Equ. (8)}$$

It may be noticed that Equation (8) is not defined when Y'=0. In one embodiment, it is possible to assign cb some value, e.g., 128, when Y'=0. In this case, Y'=0 may mean neutral color information may be found in the Cb channel. Thus, one possible mapping for the Cb channel may be given by:

$$c_b = \begin{cases} m_b \left[ \left( \frac{C_B - T}{M_B \cdot Y'} + 1 \right)^{\frac{\Gamma \cdot s}{\gamma}} - 1 \right] \cdot y' + t & \text{for } Y' \neq 0 \\ 128 & \text{for } Y' = 0 \end{cases} \quad \text{Equ. (9)}$$

It should be appreciated that a similar procedure may be applied to derive the correction for the Cr component:

$$c_r = \begin{cases} m_r \left[ \left( \frac{C_R - T}{M_R \cdot Y'} + 1 \right)^{\frac{\Gamma \cdot s}{\gamma}} - 1 \right] \cdot y' + t & \text{for } Y' \neq 0 \\ 128 & \text{for } Y' = 0 \end{cases} \quad \text{Equ. (10)}$$

where the constants MR and mr may have similar definition as MB and mb, and their values may vary for different standards or specifications.

In some embodiments, if the original high-bit-depth signal is in the 4:4:4 format (i.e., all components in full resolution), the resolution of Y' and y' may not need to be changed for applying Equations (9) and (10). If the input is in the 4:2:0 format (i.e., the height and the width for the Cb and the Cr components are down-sampled by a factor of 2), it may be possible to sub-sample Y' and y' before mapping the chromatic components.

Derivation of Parameters for Different Standards

Now, it will be discussed a few embodiments as to how to derive the parameters Mb, mb, MR, mr, T and t for equations (9) and (10) for the ITU-R BT.601 and ITU-R BT.709 standards. Merely for the exemplary purposes, it may be assumed the input is a 10-bit signal and the value of D is equal to 210−1=1023. Of course, other assumptions may yield different results accordingly—and this discussion is not meant to be limiting to the scope of the present application.

According to ITU-R BT.601, KB=kb=0.114 and qb=224. It is possible to use, e.g., the maximum value for QB, which is 1022. Using Equations (2), it is possible to get MB=0.5638, and mb=0.4957. Likewise, it is possible to compute MR and mr for the Cr component: MR=0.7126 and mr=0.6266. The values of T and t may be determined: T=(1023+1)/2=512 and t is 128.

Regarding ITU-R BT.709, it is possible to perform similar computations and obtain: MB=0.5384, mb=0.4734, MR=0.6344, mr=0.5578, T=512, and t=128.

For both cases, the parameter s may control the saturation of the output signal. The larger the value of s, the more saturated is the resulting image/video. Its moderate value may be around 0.8. The gamma value Γ depends on how the high-bit-depth video is encoded; with 2.2 being one of the most commonly used values. The gamma value γ is assigned based on how the 8-bit output should be gamma corrected. 1.8 and 2.2 are two widely-used values for γ.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A system for mapping input image data having a first dynamic range, to output image data having a second dynamic range, said second dynamic range being a lower dynamic range than said first dynamic image range, said system comprising:

a tone mapping module, said tone mapping module inputting a luminance signal (Y') from said input image data and outputting a tone-mapped luminance signal (y') for said output image data; and a color mapping module, said color mapping module inputting chroma signals from said input image data and inputting said tone-mapped luminance signal from said tone mapping module, said tone-mapped luminance signal being associated with said chroma signals, and said color mapping module outputting chroma signals for said output image data; and wherein said input image data and said output image data are YCbCr image data;

said input image data has a high dynamic range (HDR) image format for an HDR image capture device;

said output image data has a low dynamic range (LDR) image format for an LDR display device;

said color mapping module is capable of mapping said chroma signals ($C_B$ and $C_R$) of said input image data to said chroma signals ($c_b$ and $c_r$) of said output image data using a function dependent upon (y', s, $\Gamma$, $\gamma$) where y' comprises the tone mapped luminance signal, s comprises a saturation adjustment term, $\Gamma$ comprises the gamma value for said HDR image capture device, and y comprises the gamma value for said LDR display device; and said function comprises $$c_b = \left\{ m_b \left[ \left( \frac{C_B - T}{M_B \cdot Y'} + 1 \right)^{\frac{\Gamma \cdot s}{\gamma}} - 1 \right] \cdot y' + t \right. \\ 128$$

and $$c_r = \left\{ m_r \left[ \left( \frac{C_R - T}{M_R \cdot Y'} + 1 \right)^{\frac{\Gamma \cdot s}{\gamma}} - 1 \right] \cdot y' + t \right. \\ 128$$

wherein cb=cr=128 when Y'=0, T is an offset for said HDR image format, t is an offset for said LDR image format, and $M_B$, $m_b$, $M_R$, and $m_r$ are scaling constants.

2. The system as recited in claim 1 wherein the parameters ($M_b$, $m_b$, $M_R$, $M_r$, T and t) of said function comprise values derived from image data standards.

3. The system as recited in claim 2 wherein said image data standards comprise one of a group, said group comprising: ITU-R BT.601 and ITU-R BT.709 standards.

4. A method for mapping an input image data of a first image data format, said first image data format comprising a first dynamic range, to an output image data of a second image data format, said second image data format comprising a second dynamic range, said second dynamic range comprising a lower dynamic range than said first dynamic image range, the steps of said method comprising:

inputting said input image data of said first image data format, said input image data including a luminance signal (Y'), a first chroma signal ($C_B$), and a second chroma signal ($C_R$);

tone mapping said input image data, said tone mapping including extracting a tone-mapped luminance signal (y') from said input image data; and color mapping said input image data, said color mapping inputting said tone-mapped luminance signal and said chroma signals from said input image data and outputting an output image data of a second image data format including said mapped luminance signal (y') and mapped chroma signals ($c_b$ and $c_r$); and wherein the step of color mapping further comprises the step of applying a function dependent upon (y', s, $\Gamma$, $\gamma$) where y' comprises the tone mapped luminance signal, s comprises a saturation adjustment term, $\Gamma$ comprises the gamma value for a high dynamic range (HDR) image capture device having an HDR image format, and $\gamma$ comprises the gamma value for a low dynamic range (LDR) display device having an LDR image format;

said function comprising $$c_b = \left\{ m_b \left[ \left( \frac{C_B - T}{M_B \cdot Y'} + 1 \right)^{\frac{\Gamma \cdot s}{\gamma}} - 1 \right] \cdot y' + t \right. \\ 128$$

and $$c_r = \left\{ m_r \left[ \left( \frac{C_R - T}{M_R \cdot Y'} + 1 \right)^{\frac{\Gamma \cdot s}{\gamma}} - 1 \right] \cdot y' + t \right. \\ 128$$

wherein cb=cr=128 when Y'=0, T is an offset for said HDR image format, t is an offset for said LDR image format, and $M_B$, $m_b$, $M_R$, and $m_r$ are scaling constants.

5. The method as recited in claim 4 wherein the step of tone mapping further comprises the step of inputting the luminance signal, Y', from input image data in YCbCr format.

6. The method as recited in claim 4 wherein the parameters ($M_b$, $m_b$, $M_R$, $m_r$, T and t) of said function comprise values derived from image data standards.

7. The method as recited in claim 6 wherein said image data standards comprise one of a group, said group comprising: ITU-R BT.601 and ITU-R BT.709 standards.

* * * * *